(12) United States Patent
Qian et al.

(10) Patent No.: US 11,810,322 B2
(45) Date of Patent: Nov. 7, 2023

(54) CAMERA POSE ESTIMATION TECHNIQUES

(71) Applicant: TUSIMPLE, INC., San Diego, CA (US)

(72) Inventors: Chenzhe Qian, San Diego, CA (US); Yi Luo, San Diego, CA (US); Ke Xu, San Diego, CA (US); Mingdong Wang, San Diego, CA (US); Xiaodi Hou, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 84 days.

(21) Appl. No.: 17/225,396

(22) Filed: Apr. 8, 2021

(65) Prior Publication Data

US 2021/0319584 A1 Oct. 14, 2021

Related U.S. Application Data

(60) Provisional application No. 63/007,895, filed on Apr. 9, 2020.

(51) Int. Cl.
*G06T 7/73* (2017.01)
(52) U.S. Cl.
CPC ...... *G06T 7/74* (2017.01); *G06T 2207/30244* (2013.01); *G06T 2207/30256* (2013.01)
(58) Field of Classification Search
CPC .... G06V 20/588; G06V 20/176; G06V 20/41; G06V 20/56; G06V 20/58; G06V 10/454; G06V 10/806; G06V 10/811; G06V 10/82; G06V 2201/10; G06V 30/19173; G06V 30/194; G06T 17/05; G06T 2200/04; G06T 2207/10012; G06T 2207/30244; G06T 2207/30256; G06T 7/344; G06T 7/74
See application file for complete search history.

(56) References Cited

U.S. PATENT DOCUMENTS

| | | |
|---|---|---|
| 6,084,870 A | 7/2000 | Wooten et al. |
| 6,263,088 B1 | 7/2001 | Crabtree et al. |
| 6,594,821 B1 | 7/2003 | Banning et al. |

(Continued)

FOREIGN PATENT DOCUMENTS

| | | |
|---|---|---|
| CN | 102815305 A | 12/2012 |
| CN | 105667518 A | 6/2016 |

(Continued)

OTHER PUBLICATIONS

Extended European Search Report for European Patent Application No. 18849237.5, dated Apr. 23, 2021.

(Continued)

*Primary Examiner* — Ian L Lemieux
(74) *Attorney, Agent, or Firm* — Paul Liu; Glenn Theodore Mathews; Perkins Coie, LLP (57) ABSTRACT

Techniques are described for estimating pose of a camera located on a vehicle. An exemplary method of estimating camera pose includes obtaining, from a camera located on a vehicle, an image including a lane marker on a road on which the vehicle is driven, and estimating a pose of the camera such that the pose of the camera provides a best match according to a criterion between a first position of the lane marker determined from the image and a second position of the lane marker determined from a stored map of the road.

13 Claims, 6 Drawing Sheets

(56) References Cited

U.S. PATENT DOCUMENTS

| | | |
|---|---|---|
| 6,777,904 B1 | 8/2004 | Degner et al. |
| 6,975,923 B2 | 12/2005 | Spriggs |
| 7,103,460 B1 | 9/2006 | Breed |
| 7,689,559 B2 | 3/2010 | Canright et al. |
| 7,742,841 B2 | 6/2010 | Sakai et al. |
| 7,783,403 B2 | 8/2010 | Breed |
| 7,844,595 B2 | 11/2010 | Canright et al. |
| 8,041,111 B1 | 10/2011 | Wilensky |
| 8,064,643 B2 | 11/2011 | Stein et al. |
| 8,082,101 B2 | 12/2011 | Stein et al. |
| 8,164,628 B2 | 4/2012 | Stein et al. |
| 8,175,376 B2 | 5/2012 | Marchesotti et al. |
| 8,271,871 B2 | 9/2012 | Marchesotti |
| 8,346,480 B2 | 1/2013 | Trepagnier et al. |
| 8,378,851 B2 | 2/2013 | Stein et al. |
| 8,392,117 B2 | 3/2013 | Dolgov et al. |
| 8,401,292 B2 | 3/2013 | Park et al. |
| 8,412,449 B2 | 4/2013 | Trepagnier et al. |
| 8,478,072 B2 | 7/2013 | Aisaka et al. |
| 8,553,088 B2 | 10/2013 | Stein et al. |
| 8,706,394 B2 | 4/2014 | Trepagnier et al. |
| 8,718,861 B1 | 5/2014 | Montemerlo et al. |
| 8,788,134 B1 | 7/2014 | Litkouhi et al. |
| 8,908,041 B2 | 12/2014 | Stein et al. |
| 8,917,169 B2 | 12/2014 | Schofield et al. |
| 8,963,913 B2 | 2/2015 | Baek |
| 8,965,621 B1 | 2/2015 | Urmson et al. |
| 8,981,966 B2 | 3/2015 | Stein et al. |
| 8,983,708 B2 | 3/2015 | Choe et al. |
| 8,993,951 B2 | 3/2015 | Schofield et al. |
| 9,002,632 B1 | 4/2015 | Emigh |
| 9,008,369 B2 | 4/2015 | Schofield et al. |
| 9,025,880 B2 | 5/2015 | Perazzi et al. |
| 9,042,648 B2 | 5/2015 | Wang et al. |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes et al. |
| 9,118,816 B2 | 8/2015 | Stein et al. |
| 9,120,485 B1 | 9/2015 | Dolgov |
| 9,122,954 B2 | 9/2015 | Srebnik et al. |
| 9,134,402 B2 | 9/2015 | Sebastian et al. |
| 9,145,116 B2 | 9/2015 | Clarke et al. |
| 9,147,255 B1 | 9/2015 | Zhang et al. |
| 9,156,473 B2 | 10/2015 | Clarke et al. |
| 9,176,006 B2 | 11/2015 | Stein |
| 9,179,072 B2 | 11/2015 | Stein et al. |
| 9,183,447 B1 | 11/2015 | Gdalyahu et al. |
| 9,185,360 B2 | 11/2015 | Stein et al. |
| 9,191,634 B2 | 11/2015 | Schofield et al. |
| 9,214,084 B2 | 12/2015 | Grauer et al. |
| 9,219,873 B2 | 12/2015 | Grauer et al. |
| 9,233,659 B2 | 1/2016 | Rosenbaum et al. |
| 9,233,688 B2 | 1/2016 | Clarke et al. |
| 9,248,832 B2 | 2/2016 | Huberman |
| 9,248,835 B2 | 2/2016 | Tanzmeister |
| 9,251,708 B2 | 2/2016 | Rosenbaum et al. |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein et al. |
| 9,297,641 B2 | 3/2016 | Stein |
| 9,299,004 B2 | 3/2016 | Lin et al. |
| 9,315,192 B1 | 4/2016 | Zhu et al. |
| 9,317,033 B2 | 4/2016 | Ibanez-Guzman et al. |
| 9,317,776 B1 | 4/2016 | Honda et al. |
| 9,330,334 B2 | 5/2016 | Lin et al. |
| 9,342,074 B2 | 5/2016 | Dolgov et al. |
| 9,347,779 B1 | 5/2016 | Lynch |
| 9,355,635 B2 | 5/2016 | Gao et al. |
| 9,365,214 B2 | 6/2016 | Shalom et al. |
| 9,399,397 B2 | 7/2016 | Mizutani et al. |
| 9,418,549 B2 | 8/2016 | Kang et al. |
| 9,428,192 B2 | 8/2016 | Schofield et al. |
| 9,436,880 B2 | 9/2016 | Bos et al. |
| 9,438,878 B2 | 9/2016 | Niebla, Jr. et al. |
| 9,443,163 B2 | 9/2016 | Springer |
| 9,446,765 B2 | 9/2016 | Shalom et al. |
| 9,459,515 B2 | 10/2016 | Stein |
| 9,466,006 B2 | 10/2016 | Duan |
| 9,476,970 B1 | 10/2016 | Fairfield et al. |
| 9,483,839 B1 | 11/2016 | Kwon et al. |
| 9,490,064 B2 | 11/2016 | Hirosawa et al. |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein et al. |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,552,657 B2 | 1/2017 | Ueno et al. |
| 9,555,803 B2 | 1/2017 | Pawlicki et al. |
| 9,568,915 B1 | 2/2017 | Berntorp et al. |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali et al. |
| 9,669,827 B1 | 6/2017 | Ferguson et al. |
| 9,672,446 B1 | 6/2017 | Vallespi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris et al. |
| 9,723,099 B2 | 8/2017 | Chen et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath et al. |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,842,399 B2 | 12/2017 | Yamaguchi |
| 9,953,236 B1 | 4/2018 | Huang et al. |
| 10,147,193 B2 | 12/2018 | Huang et al. |
| 10,223,806 B1 | 3/2019 | Luo et al. |
| 10,223,807 B1 | 3/2019 | Luo et al. |
| 10,410,055 B2 | 9/2019 | Wang et al. |
| 10,529,089 B2 * | 1/2020 | Ahmad ................. G06T 7/593 |
| 10,698,100 B2 | 6/2020 | Becker et al. |
| 10,816,354 B2 | 10/2020 | Liu |
| 2001/0051845 A1 | 12/2001 | Itoh |
| 2003/0114980 A1 | 6/2003 | Klausner et al. |
| 2003/0174773 A1 | 9/2003 | Comaniciu et al. |
| 2004/0264763 A1 | 12/2004 | Mas et al. |
| 2007/0088497 A1 | 4/2007 | Jung |
| 2007/0183661 A1 | 8/2007 | El-maleh et al. |
| 2007/0183662 A1 | 8/2007 | Wang et al. |
| 2007/0230792 A1 | 10/2007 | Shashua et al. |
| 2007/0286526 A1 | 12/2007 | Abousleman et al. |
| 2008/0109118 A1 | 5/2008 | Schwartz et al. |
| 2008/0249667 A1 | 10/2008 | Horvitz et al. |
| 2009/0040054 A1 | 2/2009 | Wang et al. |
| 2009/0087029 A1 | 4/2009 | Coleman et al. |
| 2009/0243825 A1 | 10/2009 | Schofield |
| 2010/0049397 A1 | 2/2010 | Liu et al. |

(56) References Cited

U.S. PATENT DOCUMENTS

| | | |
|---|---|---|
| 2010/0082238 A1 | 4/2010 | Nakamura et al. |
| 2010/0111417 A1 | 5/2010 | Ward et al. |
| 2010/0226564 A1 | 9/2010 | Marchesotti et al. |
| 2010/0281361 A1 | 11/2010 | Marchesotti |
| 2011/0142283 A1 | 6/2011 | Huang et al. |
| 2011/0206282 A1 | 8/2011 | Aisaka et al. |
| 2011/0247031 A1 | 10/2011 | Jacoby |
| 2012/0041636 A1 | 2/2012 | Johnson et al. |
| 2012/0105639 A1 | 5/2012 | Stein et al. |
| 2012/0120069 A1 | 5/2012 | Kodaira et al. |
| 2012/0140076 A1 | 6/2012 | Rosenbaum et al. |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko et al. |
| 2013/0182134 A1 | 7/2013 | Grundmann et al. |
| 2013/0204465 A1 | 8/2013 | Phillips et al. |
| 2013/0266187 A1 | 10/2013 | Bulan et al. |
| 2013/0329052 A1 | 12/2013 | Chew |
| 2014/0063489 A1 | 3/2014 | Steffey et al. |
| 2014/0072170 A1 | 3/2014 | Zhang et al. |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa et al. |
| 2014/0198184 A1 | 7/2014 | Stein et al. |
| 2014/0314322 A1 | 10/2014 | Snavely et al. |
| 2014/0321704 A1 | 10/2014 | Partis |
| 2014/0334668 A1 | 11/2014 | Saund |
| 2015/0062304 A1 | 3/2015 | Stein et al. |
| 2015/0127239 A1 | 5/2015 | Breed et al. |
| 2015/0253428 A1 | 9/2015 | Holz |
| 2015/0269437 A1 | 9/2015 | Maruyama et al. |
| 2015/0269438 A1 | 9/2015 | Samarasekera et al. |
| 2015/0292891 A1 | 10/2015 | Kojo |
| 2015/0310370 A1 | 10/2015 | Burry et al. |
| 2015/0353082 A1 | 12/2015 | Lee et al. |
| 2016/0008988 A1 | 1/2016 | Kennedy et al. |
| 2016/0026787 A1 | 1/2016 | Nairn et al. |
| 2016/0037064 A1 | 2/2016 | Stein et al. |
| 2016/0046290 A1 | 2/2016 | Aharony et al. |
| 2016/0094774 A1 | 3/2016 | Li et al. |
| 2016/0118080 A1 | 4/2016 | Chen |
| 2016/0125608 A1 | 5/2016 | Sorstedt |
| 2016/0129907 A1 | 5/2016 | Kim et al. |
| 2016/0165157 A1 | 6/2016 | Stein et al. |
| 2016/0191860 A1 | 6/2016 | Jung |
| 2016/0210528 A1 | 7/2016 | Duan |
| 2016/0275766 A1 | 9/2016 | Venetianer et al. |
| 2016/0321381 A1 | 11/2016 | English et al. |
| 2016/0321817 A1 | 11/2016 | Ratcliff et al. |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0061632 A1 | 3/2017 | Lindner et al. |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0227647 A1 | 8/2017 | Baik |
| 2017/0301104 A1 | 10/2017 | Qian et al. |
| 2017/0305423 A1 | 10/2017 | Green |
| 2017/0318407 A1 | 11/2017 | Meister et al. |
| 2017/0363423 A1 | 12/2017 | Dormody et al. |
| 2018/0005407 A1 | 1/2018 | Browning et al. |
| 2018/0111274 A1 | 4/2018 | Seok et al. |
| 2018/0131924 A1 | 5/2018 | Jung et al. |
| 2018/0149739 A1 | 5/2018 | Becker et al. |
| 2018/0151063 A1 | 5/2018 | Pun et al. |
| 2018/0158197 A1 | 6/2018 | Dasgupta et al. |
| 2018/0188043 A1 | 7/2018 | Chen et al. |
| 2018/0216943 A1 | 8/2018 | Hawkins et al. |
| 2018/0260956 A1 | 9/2018 | Huang et al. |
| 2018/0268566 A1 | 9/2018 | Houts et al. |
| 2018/0283892 A1 | 10/2018 | Behrendt et al. |
| 2018/0284278 A1 | 10/2018 | Russell et al. |
| 2018/0312125 A1 | 11/2018 | Jung et al. |
| 2018/0315201 A1 | 11/2018 | Cameron et al. |
| 2018/0364717 A1 | 12/2018 | Douillard et al. |
| 2018/0373254 A1 | 12/2018 | Song et al. |
| 2018/0373980 A1 | 12/2018 | Huval |
| 2019/0025853 A1 | 1/2019 | Julian et al. |
| 2019/0065863 A1 | 2/2019 | Luo et al. |
| 2019/0066329 A1 | 2/2019 | Luo et al. |
| 2019/0066330 A1 | 2/2019 | Luo et al. |
| 2019/0108384 A1 | 4/2019 | Wang et al. |
| 2019/0132391 A1 | 5/2019 | Thomas et al. |
| 2019/0132392 A1 | 5/2019 | Liu et al. |
| 2019/0163989 A1 | 5/2019 | Guo et al. |
| 2019/0210564 A1 | 7/2019 | Han et al. |
| 2019/0210613 A1 | 7/2019 | Sun et al. |
| 2019/0226851 A1 | 7/2019 | Nicosevici et al. |
| 2019/0236950 A1 | 8/2019 | Li et al. |
| 2019/0266420 A1 | 8/2019 | Ge et al. |
| 2019/0271549 A1* | 9/2019 | Zhang ................ G05D 1/0246 |
| 2019/0312993 A1 | 10/2019 | Yamashita et al. |
| 2019/0339084 A1 | 11/2019 | Korenaga et al. |
| 2020/0089973 A1* | 3/2020 | Efland ................ G05D 1/0246 |
| 2020/0271473 A1 | 8/2020 | Wang et al. |
| 2021/0183099 A1* | 6/2021 | Fujii .................... G06T 7/74 |
| 2021/0373161 A1* | 12/2021 | Lu ..................... G06V 10/82 |

FOREIGN PATENT DOCUMENTS

| | | | |
|---|---|---|---|
| CN | 105825173 A | 8/2016 | |
| CN | 106340197 A | 1/2017 | |
| CN | 106781591 A | 5/2017 | |
| CN | 106909876 A | 6/2017 | |
| CN | 107015238 A * | 8/2017 | |
| CN | 107111742 A | 8/2017 | |
| CN | 108010360 A | 5/2018 | |
| CN | 111256693 A * | 6/2020 | ............. G01C 21/20 |
| DE | 2608513 A1 | 9/1977 | |
| EP | 0890470 A2 | 1/1999 | |
| EP | 1754179 A1 | 2/2007 | |
| EP | 2448251 A2 | 5/2012 | |
| EP | 2463843 A2 | 6/2012 | |
| EP | 2761249 A1 | 8/2014 | |
| EP | 2918974 A1 | 9/2015 | |
| EP | 2946336 A2 | 11/2015 | |
| EP | 2993654 A1 | 3/2016 | |
| EP | 3081419 A1 | 10/2016 | |
| EP | 3819673 A1 * | 5/2021 | ......... G01C 21/3602 |
| JP | 2017198566 A | 11/2017 | |
| KR | 100802511 B1 | 2/2008 | |
| KR | 20170065083 A | 6/2017 | |
| WO | 1991009375 A1 | 6/1991 | |
| WO | 2005098739 A1 | 10/2005 | |
| WO | 2005098751 A1 | 10/2005 | |
| WO | 2005098782 A1 | 10/2005 | |
| WO | 2010109419 A1 | 9/2010 | |
| WO | 2013045612 A1 | 4/2013 | |
| WO | 2014111814 A2 | 7/2014 | |
| WO | 2014166245 A1 | 10/2014 | |
| WO | 2014201324 A1 | 12/2014 | |
| WO | 2015083009 A1 | 6/2015 | |
| WO | 2015103159 A1 | 7/2015 | |
| WO | 2015125022 A2 | 8/2015 | |
| WO | 2015186002 A2 | 12/2015 | |
| WO | 2016090282 A1 | 6/2016 | |
| WO | 2016135736 A2 | 9/2016 | |
| WO | 2017013875 A1 | 1/2017 | |
| WO | 2017079349 A1 | 5/2017 | |
| WO | 2017079460 A2 | 5/2017 | |
| WO | 2018132608 A2 | 7/2018 | |
| WO | 2019040800 A1 | 2/2019 | |
| WO | 2019084491 A1 | 5/2019 | |
| WO | 2019084494 A1 | 5/2019 | |
| WO | 2019140277 A2 | 7/2019 | |
| WO | 2019161134 A1 | 8/2019 | |
| WO | 2019168986 A1 | 9/2019 | |

(56) References Cited

FOREIGN PATENT DOCUMENTS

| WO | 2020038118 | A1 | 2/2020 | |
| WO | 2020097512 | A2 | 5/2020 | |
| WO | WO-2021017213 | A1 * | 2/2021 | ............ G01C 25/00 |

OTHER PUBLICATIONS

Extended European Search Report for European Patent Application No. 21166828.0, dated Aug. 5, 2021 (8 pages).
International Application No. PCT/US18/53795, International Search Report and Written Opinion dated Dec. 31, 2018.
International Application No. PCT/US18/57848, International Search Report and Written Opinion dated Jan. 7, 2019.
International Application No. PCT/US19/12934, International Search Report and Written Opinion dated Apr. 29, 2019.
International Application No. PCT/US19/25995, International Search Report and Written Opinion dated Jul. 9, 2019.
International Application No. PCT/US2018/047608, International Search Report and Written Opinion dated Dec. 28, 2018.
International Application No. PCT/US2018/047830, International Search Report and Written Opinion dated Apr. 27, 2017.
International Application No. PCT/US2018/057851, International Search Report and Written Opinion dated Feb. 1, 2019.
International Application No. PCT/US2019/013322, International Search Report and Written Opinion dated Apr. 2, 2019.
International Application No. PCT/US2019/019839, International Search Report and Written Opinion dated May 23, 2019.
International Search Report and Written Opinion for PCT/US19/060547, dated Jun. 25, 2020.
Luo, Yi et al. U.S. Appl. No. 15/684,389 Notice of Allowance, dated Oct. 9, 2019.
Office Action for Chinese Application No. 201810025516.X, dated Sep. 3, 2019.
Ahn, Kyoungho, et al., "The Effects of Route Choice Decisions on Vehicle Energy Consumption and Emissions", Virginia Tech Transportation Institute, date unknown.
Athanasiadis, Thanos, et al., "Semantic Image Segmentation and Object Labeling", IEEE Transactions on Circuits and Systems for Video Technology, 17(3).
Barth, Matthew, et al., "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Carle, Patrick J.F., "Global Rover Localization by Matching Lidar and Orbital 3D Maps.", IEEE, Anchorage Convention Distriction, pp. 1-6, May 3-8, 2010. (Anchorage Alaska, US), May 3-8, 2019.
Caselitz, et al., "Monocular Camera Localization in 3D LiDAR Maps", Germany.
Cordts, Marius, et al., "The Cityscapes Dataset for Semantic Urban Scene Understanding", Proceedings of the IEEE Computer Society Conference on Computer Vision and Pattern Recognition {CVPR), Las Vegas.
Dai, Jifeng, et al., "Instance-aware Semantic Segmentation via Multi-task Network Cascades", Microsoft Research, CVPR, 10 pp.
Engel, et al., "LSD-SLAM: Large-Scale Direct Monocular SLAM", Munich.
Geiger, Andreas, et al., "Automatic Camera and Range Sensor Calibration using a single Shot", Robotics and Automation (ICRA), IEEE International Conference, 1-8.
Guarneri, P., et al., "A Neural-Network-Based Model for the Dynamic Simulation of the Tire/Suspension System While Traversing Road Irregularities", IEEE Transactions on Neural Networks, 19(9), 1549-1563.
Gurghian, A., et al., "DeepLanes: End-to-End Lane Position Estimation using Deep Neural Networks", 2016 IEEE Conference on Computer Vision and Pattern Recognition Workshops, pp. 38-45.
Hillel, Aharon B., et al., "Recent Progress in Road and Late Detection—A Survey".
Hou, Xiaodi, et al., "Image Signature: Highlighting Sparse Salient Regions", IEEE Transactions on Pattern Analysis and Machine Intelligence, 34(1), 194-201.
Hou, Xiaodi, et al., "A Meta-Theory of Boundary Detection Benchmarks", arXiv preprint arXiv:1302.5985, 2013.
Hou, Xiaodi, et al., "A Time-Dependent Model of Information Capacity of Visual Attention", International Conference on Neural Information Processing, Springer Berlin Heidelberg, 127-136.
Hou, Xiaodi, et al., "Boundary Detection Benchmarking: Beyond F-Measures", Computer Vision and Pattern Recognition, CVPR'13, IEEE, 1-8.
Hou, Xiaodi, et al., "Color Conceptualization", Proceedings of the 15th ACM International Conference on Multimedia, ACM, 265-268.
Hou, Xiaodi, "Computational Modeling and Psychophysics in Low and Mid-Level Vision", California Institute of Technology.
Hou, Xiaodi, et al., "Dynamic Visual Attention: Searching for Coding Length Increments", Advances in Neural Information Processing Systems, 21, 681-688.
Hou, Xiaodi, et al., "Saliency Detection: A Spectral Residual Approach", Computer Vision and Pattern Recognition, CVPR'07—IEEE Conference, 1-8.
Hou, Xiaodi, et al., "Thumbnail Generation Based on Global Saliency", Advances in Cognitive Neurodynamics, ICCN 2007, Springer Netherlands, 999-1003.
Huval, Brody, et al., "An Empirical Evaluation of Deep Learning on Highway Driving", arXiv:1504.01716v3 [cs.RO], 7 pp.
Jain, Suyong Dutt, et al., "Active Image Segmentation Propagation", In Proceedings of the IEEE Conference on Computer Vision and Pattern Recognition (CVPR), Las Vegas.
Kendall, Alex, et al., "What Uncertainties Do We Need in Bayesian Deep Learning for Computer Vision", arXiv:1703.04977v1 [cs.CV].
Levinson, Jesse, et al., "Experimental Robotics, Unsupervised Calibration for Multi-Beam Lasers", 12th Ed., Oussama Khatib, Vijay Kumar, Gaurav Sukhatme (Eds.) Springer-Verlag Berlin Heidelberg, 179-194.
Li, Tian, "Proposal Free Instance Segmentation Based on Instance-aware Metric", Department of Computer Science, Cranberry-Lemon University, Pittsburgh, PA, date unknown.
Li, Yanghao, et al., "Demystifying Neural Style Transfer", arXiv preprint arXiv:1701.01036.
Li, Yanghao, et al., "Factorized Bilinear Models for Image Recognition", arXiv preprint arXiv:1611.05709.
Li, Yanghao, et al., "Revisiting Batch Normalization for Practical Domain Adaptation", arXiv preprint arXiv:1603.04779.
Li, Yin, et al., "The Secrets of Salient Object Segmentation", Proceedings of the IEEE Conference on Computer Vision and Pattern Recognition, 280-287.
Macaodha, Oisin, et al., "Hierarchical Subquery Evaluation for Active Learning on a Graph", In Proceedings of the IEEE Conference on Computer Vision and Pattern Recognition (CVPR).
Mur-Artal, et al., "ORB-SLAM: A Versatile and Accurate Monocular SLAM System", IEEE Transactions on Robotics, Oct. 2015, vol. 31, No. 5, Spain.
Narote, S., et al., "A review of recent advances in lane detection and departure warning system", Pattern Recognition, Elsevier, 73, pp. 216-234 (2018).
Nguyen, T., "Evaluation of Lane Detection Algorithms based on an Embedded Platform", Master Thesis, Technische Universität Chemnitz, Jun. 2017, available at https://nbn-resolving.org/urn:nbn:de:bsz:ch1-qucosa-226615.
Niu, J., et al., "Robust Lane Detection using Two-stage Feature Extraction with Curve Fitting", Pattern Recognition, Elsevier, 59, pp. 225-233 (2016).
Norouzi, Mohammad, et al., "Hamming Distance Metric Learning", Departments of Computer Science and Statistics, University of Toronto, date unknown.
Paszke, Adam, et al., "Enet: A deep neural network architecture for real-time semantic segmentation", CoRR, abs/1606.02147.
Ramos, Sebastian, et al., "Detecting Unexpected Obstacles for Self-Driving Cars: Fusing Deep Learning and Geometric Modeling", arXiv:1612.06573v1 [cs.CV], 8 pp.

(56) References Cited

OTHER PUBLICATIONS

Richter, Stephen, et al., "Playing for Data: Ground Truth from Computer Games", Intel Labs, European Conference on Computer Vision (ECCV), Amsterdam, the Netherlands.
Sattler, et al., "Are Large-Scale 3D Models Really Necessary for Accurate Visual Localization?", CVPR, IEEE, 2017, 1-10.
Schindler, Andreas, et al., "Generation of high precision digital maps using circular arc splines", 2012 IEEE Intelligent Vehicles Symposium, Alcala de Henares10. I 109/IVS.2012.6232124, 246-251.
Schroff, Florian, et al., "FaceNet: A Unified Embedding for Face Recognition and Clustering", Google, CVPR, 10 pp.
Somani, Adhiraj, et al., "DESPOT: Online POMDP Planning with Regularization", Department of Computer Science, National University of Singapore, date unknown.
Spinello, Luciano, et al., "Multiclass Multimodal Detection and Tracking in Urban Environments", Sage Journals, 29(12)Article first published online: Oct. 7, 2010; Issue published: Oct. 1, 2010, 1498-1515.
Szeliski, Richard, "Computer Vision: Algorithms and Applications", http://szeliski.org/Book/.
Wang, Panqu, et al., "Understanding Convolution for Semantic Segmentation", arXiv preprint arXiv:1702.08502.
Wei, Junqing, et al., "A Prediction- and Cost Function-Based Algorithm for Robust Autonomous Freeway Driving", 2010 IEEE Intelligent Vehicles Symposium, University of California, San Diego, CA, USA.
Welinder, Peter, et al., "The Multidimensional Wisdom of Crowds", http://www.vision.caltech.edu/visipedia/papers/WelinderEtaINIPS10.pdf.
Yang, C., "Neural Network-Based Motion Control of an Underactuated Wheeled Inverted Pendulum Model", IEEE Transactions on Neural Networks and Learning Systems, 25(11), 2004-2016.
International Search Report and Written Opinion for PCT/US19/18113, dated May 8, 2019.
Yu, Kai, et al., "Large-scale Distributed Video Parsing and Evaluation Platform", Center for Research on Intelligent Perception and Computing, Institute of Automation, Chinese Academy of Sciences, China, arXiv:1611.09580v1 [cs.CV].
Zhang, Z, et al., "A Flexible new technique for camera calibration", IEEE Transactions on Pattern Analysis and Machine Intelligence, vol. 22, Issue: 11.
Zhou, Bolei, et al., "A Phase Discrepancy Analysis of Object Motion", Asian Conference on Computer Vision, Springer Berlin Heidelberg, 225-238.
Chinese Patent Office, First Search Report for CN 201980013350.2, dated Feb. 21, 2022, 3 pages with machine translation.
Chinese Patent Office, First Office Action for CN 201980013350.2, dated Feb. 25, 2022, 20 pages with machine translation.
Mingdong Wang et al., U.S. Appl. No. 16/184,926 Notice of Allowance dated Jan. 15, 2021, pp. 1-5.
Harry Y. Oh, U.S. Appl. No. 15/896,077, Non-Final Office Action dated Mar. 13, 2020, pp. 1-21.
Harry Y. Oh, U.S. Appl. No. 15/896,077, Final Office Action dated Jul. 9, 2020, pp. 1-30.
Harry Y. Oh, U.S. Appl. No. 15/896,077, Non-Final Office Action dated Oct. 1, 2020, pp. 1-34.
Harry Y. Oh, U.S. Appl. No. 16/184,926, Non-Final Office Action dated Oct. 5, 2020, pp. 1-17.
Examination Report from corresponding European Patent Application No. 21166828.0, dated Mar. 16, 2023 (8 pages).
Xiao Zhongyang et al: "Monocular Vehicle Self-localization method based on Compact Semantic Map", (2018 21st International Conference on Intelligent Transportation Systems (ITSC), IEEE, Nov. 4, 2018, pp. 3083-3090.
Siyuan Liu, U.S. Appl. No. 17/074,468 Notice of Allowance dated Oct. 7, 2022, p. 1-7.
Chinese Patent Office, First Office Action for CN 201880055025.8, dated Dec. 16, 2022, 10 pages.
Schindler, et al., "Generation of High Precision Digitial Maps using Circular Arc Splines," 2012 Intelligent Vehicles Symposium, Alcala de Henares, Spain, Jun. 3-7, 2012.
Mingdong Wang, U.S. Appl. No. 17/320,888, Non-Final Office Action dated Jan. 18, 2023, pp. 1-8.
U.S. Patent & Trademark Office, Non-Final Office Action for U.S. Appl. No. 17/308,803, dated Mar. 16, 2023, 25 pages.

* cited by examiner

CAMERA POSE ESTIMATION TECHNIQUES

CROSS-REFERENCE TO RELATED APPLICATIONS

This application claims priority to provisional patent application No. 63/007,895, titled "CAMERA POSE ESTIMATION TECHNIQUES," filed Apr. 9, 2020, the disclosure of which is hereby incorporated by reference herein.

TECHNICAL FIELD

This document describes techniques to estimate pose of a camera located on or in a vehicle.

BACKGROUND

A vehicle may include cameras attached to the vehicle for several purposes. For example, cameras may be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the vehicle. For example, images obtained by a camera can be analyzed to determine distances of objects surrounding the autonomous vehicle so that the autonomous vehicle can be safely maneuvered around the objects.

SUMMARY

This patent document describes exemplary techniques to estimate pose of a camera located on or in a vehicle. A method of estimating camera pose includes obtaining, from a camera located on a vehicle, an image including a lane marker on a road on which the vehicle is driven; and estimating a pose of the camera such that the pose of the camera provides a best match according to a criterion between a first position of the lane marker determined from the image and a second position of the lane marker determined from a stored map of the road.

In some embodiments, the first position corresponds to pixel locations associated with a corner of the lane marker, and the second position corresponds to a three-dimensional (3D) world coordinates of the corner of the lane marker. In some embodiments, the first position corresponds to pixel locations associated with the lane marker, and wherein the second position corresponds to a three-dimensional (3D) world coordinates of the lane marker. In some embodiments, the best match according to the criterion is determined by minimizing a function of a cost of misalignment term by: minimizing a distance from the 3D world coordinates of the corner of the lane marker to the pixel locations associated with the corner of the lane marker. In some embodiments, the distance is minimized by minimizing a sum of squared distance between the pixel locations associated with the corner of the lane marker and the 3D world coordinates of the corner of the lane marker.

In some embodiments, the best match according to the criterion is determined by minimizing the function of a combination of the cost of misalignment term and of a cost of constraint term, the cost of constraint term represents a constraint to limit or that limits parameter search space, and the cost of constraint term is determined by minimizing a difference between the pixel locations and a third position of the corner of the lane marker from a previous image obtained as the vehicle is driven.

In some embodiments, the method further includes generating a binary image from the image obtained from the camera; and generating a gray-scale image from the binary image, the gray-scale image includes pixels with corresponding values, a value of each pixel is a function of a distance between a pixel location in the gray-scale image and the first position of the corner of lane marker in the gray-scale image.

In some embodiments, the second position of the lane marker is determined based on the location of the vehicle, a direction in which the vehicle is driven, and a pre-determined field of view (FOV) of the camera. In some embodiments, the second position of the lane marker is determined by: obtaining, from the stored map and based on the location of the vehicle, a first set of one or more lane markers that are located within a pre-determined distance from the vehicle; obtaining a second set of one or more lane markers from the first set of one or more lane markers based on the direction in which the vehicle is driven; obtaining a third set of one or more lane markers from the second set of one or more lane markers based on a pre-determined FOV of the camera; and obtaining the second position of the lane marker from the third set of one or more lane markers. In some embodiments, the third set of one or more lane markers excludes one or more lane markers determined to be obstructed by one or more objects.

In another exemplary aspect, the above-described methods are embodied in the form of processor-executable code and stored in a non-transitory computer-readable storage medium. The non-transitory computer readable storage includes code that when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

An autonomous vehicle includes cameras to obtain images of one or more areas surrounding the autonomous vehicle. These images can be analyzed by a computer on-board the autonomous vehicle to obtain distance or other information about the road or about the objects surrounding the autonomous vehicle. However, a camera's pose needs to be determined so that the computer on-board the autonomous vehicle can precisely or accurately detect an object and determine its distance.

Figure 1:
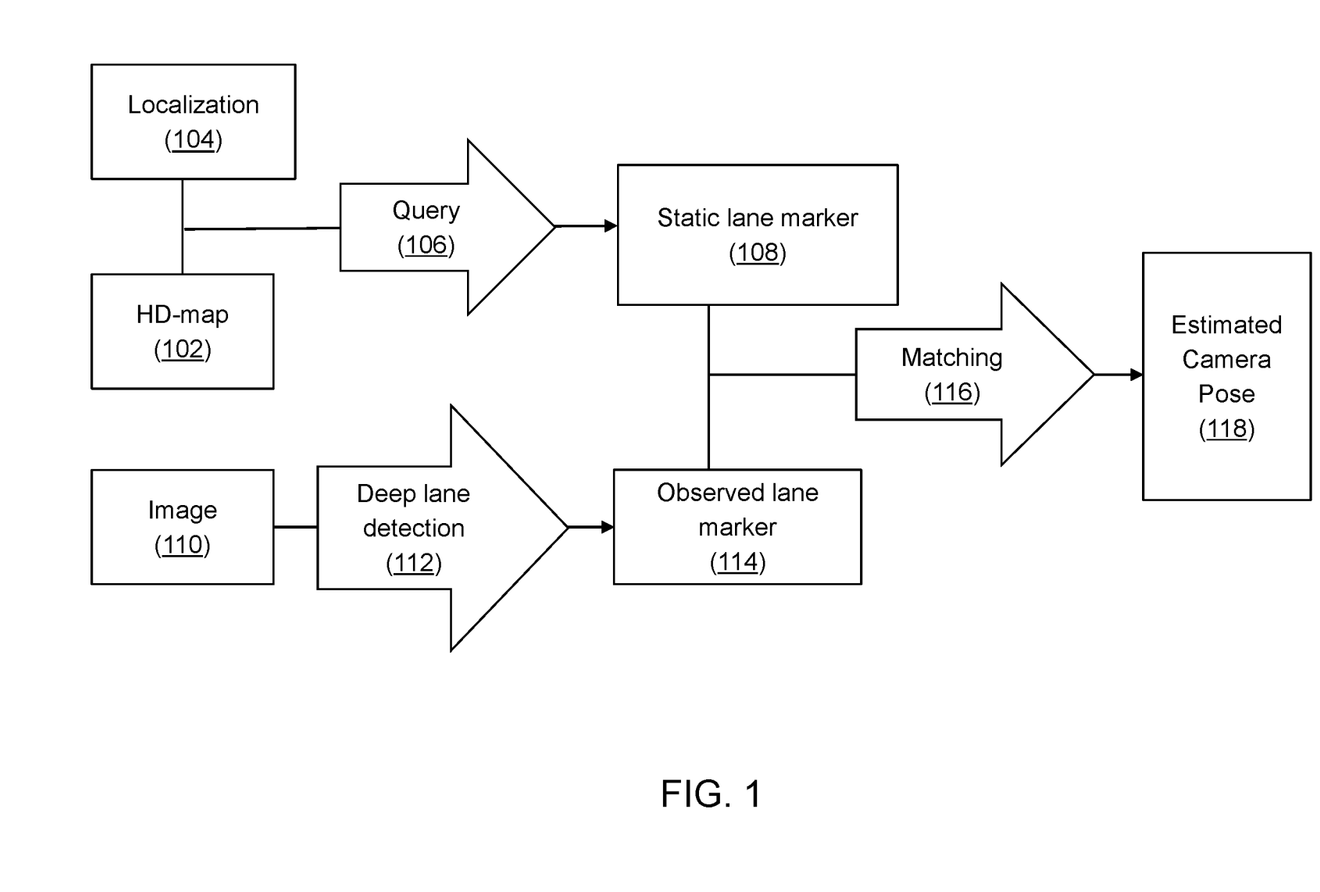
FIG. 1 shows a block diagram to estimate a pose of a camera located on or in a vehicle.

FIG. 1 shows a block diagram to estimate a pose of a camera located on or in a vehicle. A camera's pose can be estimated in real-time as an autonomous vehicle is operated or being driven on a road. In an autonomous vehicle, a plurality of cameras can be coupled to a roof of the cab to capture images of a region towards which the autonomous vehicle is being driven. Due to the non-rigidity of the mechanical structure through which the cameras can be coupled to the autonomous vehicle, the cameras can experience random vibration when engine is on and/or when the autonomous vehicle is driven on the road or from wind. FIG. 1 shows a block diagram that can be used to estimate a camera's pose (orientation and position) in six degrees-of-freedom (DoF). The six DoF parameters includes three variables for orientation (e.g., roll, pitch, yaw) of the camera and three variables for translation (x, y, z) of the camera. The precise and robust real-time camera pose can have a significant impact towards autonomous driving related applications such as tracking, depth estimation and speed estimation of objects that surround the autonomous vehicle.

On the top part of FIG. 1, at the operation 102, the exemplary camera pose estimation technique includes a high-definition (HD) map that can store information about the lane markers (shown as 210a, 210b in FIG. 2) on a road. The HD map can store information such as the three-dimension (3D) world coordinates of the four corners (shown as 212a-212b in FIG. 2) of each lane markers. The HD map can be stored in a computer located in an autonomous vehicle, where the computer performs the camera pose estimation techniques described in this patent document.

At the operation 104, the localization can include a global positioning system (GPS) transceiver located in the autonomous vehicle that can provide a position or location of the autonomous vehicle in 3D world coordinates. The computer located in the autonomous vehicle can receive the position of the autonomous vehicle and can query (shown in the operation 106) the HD map (shown in the operation 102) to obtain the 3D position of the corners of lane markers that can be located within a pre-determined distance (e.g., 100 meters) of the autonomous vehicle. Based on the query (the operation 106), the computer can obtain position information about the corners of the lane markers. At the operation 108, the position information of the corners of each lane marker can be considered a static lane marker information.

On the bottom part of FIG. 1, at the operation 110, the exemplary camera pose estimation technique includes an image that is obtained from a camera located on or in the autonomous vehicle. The computer located in the autonomous vehicle can obtain the image (the operation 110) from the camera and can perform a deep learning lane detection technique at the operation 112, to identify the lane makers and the two-dimensional position of the corners of the lane markers in the image (the operation 110). The deep learning lane detection technique (the operation 112) can also identify the two-dimension (2D) pixel location of the corners of each lane marker located in the image. Each identified lane marker and the pixel location of the corners of each lane marker in the image (the operation 110) can be considered an observed lane marker at the operation 114. In an exemplary embodiment, the deep learning lane detection can include using a convolutional neural network (CNN) that can operate based on a base framework.

In some embodiments, the computer located in the autonomous vehicle can perform data and image processing to obtain the static lane marker (the operation 108) and observed lane marker (the operation 114) every 5 milliseconds. The computer located in the autonomous vehicle can perform the matching operation (the operation 116) to minimize the distance from the 3D world coordinates of at least one corner of a lane marker obtained from the HD map and 2D pixel location of at least one corner of the corresponding lane marker in the image. The matching operation (the operation 116) can provide a best match or best fit between the lane marker obtained from the image and the corresponding lane marker obtained from the HD map. By minimizing the distance between a lane marker from the HD map and a corresponding lane marker from the image, the computer can obtain an estimated camera pose at the operation 118. The estimated camera pose can include values for the six DoF variables that describe a camera's pose.

Figure 2:
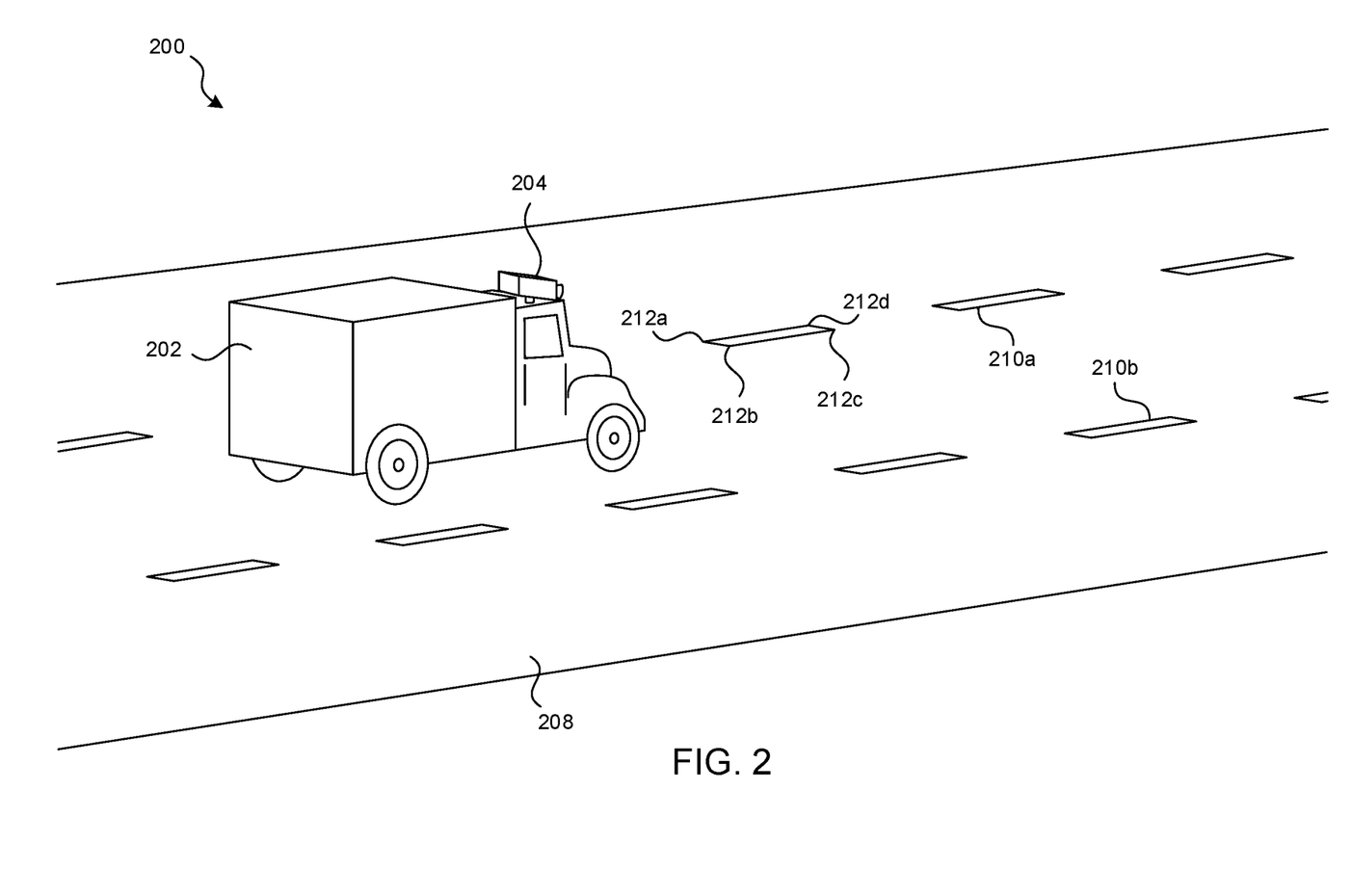
FIG. 2 shows an exemplary system that includes a vehicle on a road.

FIG. 2 shows an exemplary system 200 that includes a vehicle 202 on a road 208, where the vehicle 202 includes a plurality of cameras. In FIG. 2, a single camera 204 is shown for ease of description. However, the plurality of cameras can be located on or positioned on the vehicle 202 to obtain images of the road 208 that includes the lane markers 210a, 210b as the vehicle 202 is driven. The camera pose estimation techniques described herein for the camera 204 can be applied to estimate the pose of other cameras located on the vehicle 202. The vehicle 202 can be an autonomous vehicle.

The road 208 includes lane markers 210a, 201b that can be affixed on either side of the road 208. The lane markers include a first set of lane markers 210a located on a first side of the road 208, and a second set of lane markers 210b located on a second side of the road 208 opposite to the first side. Each lane marker can include a plurality of corners 212a-212d (e.g., four corners for a rectangular lane marker). As described in FIG. 1, a computer can be located in the vehicle 202, where the computer can include a HD map that includes the 3D world coordinates of the corners of each lane marker. In each set of lane markers, one lane marker can be separated from another lane marker by a pre-determined distance to form a set of broken lines on the road. A lane marker 210a, 210b can have a rectangular shape and can have a white color or the lane marker 210a, 210b can have another shape (e.g., square, polygon, etc.) and can have a color (e.g., black, white, red, etc.). As shown in FIG. 2, the first and second set of lane markers 210a, 210b can be parallel to each other.

Figure 3:
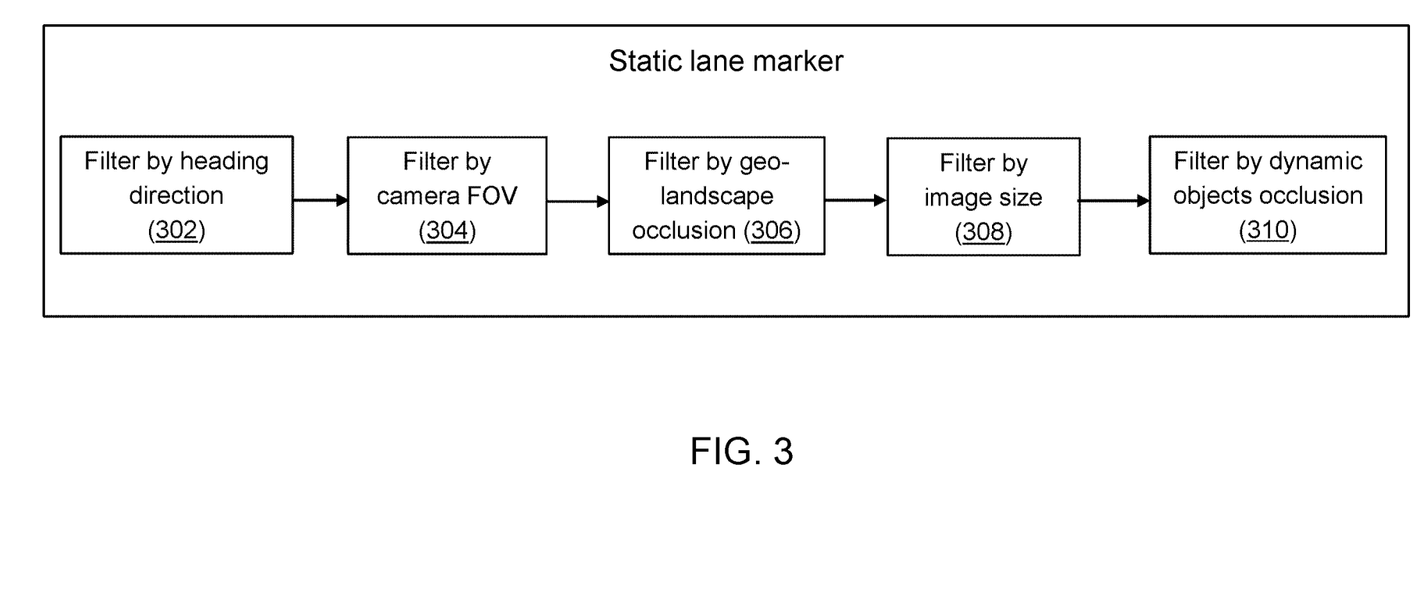
FIG. 3 shows a flow diagram of operations performed to obtain the static lane marker.

FIG. 3 shows a flow diagram of operations performed to obtain the static lane marker as described in FIG. 1. As described in FIG. 1, the computer located in the autonomous vehicle can obtain position information about the corners of a first set of one or more lane markers from an HD map, where the first set of one or more lane markers can be obtained based at least on the location of the autonomous vehicle obtained from a GPS transceiver. The localization described in FIG. 1 can also include an inertial measurement unit (IMU) sensor located on the vehicle that can provide a heading direction of the autonomous vehicle. At the operation 302, based on the heading direction, the computer located in the autonomous vehicle can filter by heading direction by filtering out or removing from the first set of one or more lane markers those lane marker(s) that are located to the side or behind the autonomous vehicle so that the computer can obtain a second set of one or more lane markers located in front of the autonomous vehicle. Next, at the operation 304, the computer can perform filter by camera's pre-determined field of view (FOV) to further narrow the second set of one or more lane markers to those lane marker(s) that are estimated to be located within a pre-determined FOV (e.g., within a pre-determined range of degrees of view) of a camera whose pose is being estimated.

At the filtering operation (the operation 304), the computer can filter lane marker(s) fetched from the static HD-map and filtered by heading direction to project onto the field of view of the camera to obtain a third set of one or more lane markers. Then, at the operation 306, the computer can optionally perform a ray racing filtering or other filtering approaches, to remove the lane marker(s) that are geometrically occluded by landscapes. For example, the computer can perform the ray racing filtering to remove the lane marker(s) behind a foreseen uphill, or the lane marker(s) blocked by trees or walls. To be more specific, the ray racing filtering or other filtering approaches can remove the lane markers that exists in the 3D world coordinates but cannot be seen from a 2D image.

Next, at the operation 308, the computer can filter the third set of one or more lane marker by image size to filter out or more lane markers that cannot be easily perceived in the image. For example, the computer can filter out or remove one or more lane markers located past a pre-determined distance (e.g., past 50 meters) from the location of the autonomous vehicle. The filtering operation (the operation 308) can yield a fourth set of one or more lane markers that are located within a pre-determined distance (e.g., 50 meters) of the location of the autonomous vehicle. Finally, at the operation 310, the computer can optionally perform filter by dynamic objects occlusion to filter out one or more lane markers from the fourth set of lane markers that the computer determines to be occluded by or obstructed by one or more objects (e.g., landscape, other vehicles, etc.) on the road to obtain a fifth set of one or more lane markers with which the computer can perform the matching operation described in FIG. 1. As further described in this patent document, at the matching operation, the computer can determine and minimize the difference between the 3D location of a corner of lane marker obtained from the HD map and pixel locations of the corner of the lane marker obtained from the image and viewed by the camera, and where the lane marker obtained from the HD map corresponds to the lane marker obtained from the image.

Figure 4:
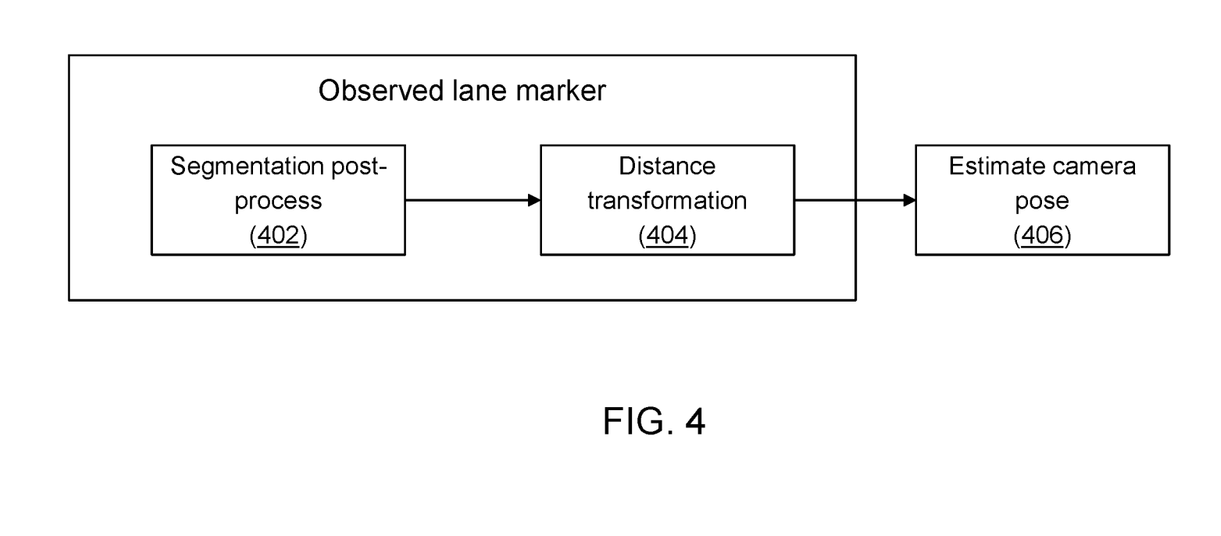
FIG. 4 shows a flow diagram of operations performed to obtain the observed lane marker and to estimate camera pose.

FIG. 4 shows a flow diagram of operations performed to obtain the observed lane marker and to estimate camera pose as described in FIG. 1. At the segmentation post-process operation (the operation 402), the observed lane marker module (shown as the observed lane marker module 625 in FIG. 6) in a computer located in the autonomous vehicle can process the image obtained from the camera to extract the representation of lane markers in the image. As described in FIG. 1, the segmentation post-process operation (the operation 402) can involve the observed lane marker module using deep learning lane detection technique to extract the lane marker from the captured image and identify pixel locations of the corners of the lane markers. At the segmentation post-process operation (the operation 402), the observed lane marker module can also generate a binary image from the obtained image.

The observed lane marker module can perform the distance transformation operation (the operation 404) to smooth out the binary image to obtain a gray-scale image. Each pixel has a value associated with it, for which, the smaller the value, the closer to the pixel of the lane marker or lane marker (e.g., pixel location of the corner of the lane marker) and the larger the value, the farther from the pixel of the lane marker or the lane marker (e.g., pixel location of the corner of the lane marker).

The camera pose module (shown as the camera pose module 630 in FIG. 6) in a computer located in the autonomous vehicle can estimate camera pose (at the operation 406) based on a set of pixels with their locations associated with pre-determined reference point, for example, the corner of the lane marker. The location of the pre-determined reference point can be obtained from the HD map (shown as the HD map 615 in FIG. 6). The computer can estimate the 6 DoF parameters by minimizing the sum of the squared distances from the lane markers fetched from the HD map to the closest lane segmentation pixels of the lane markers captured by camera that are associated with the lane marker. In some embodiments, the camera pose module can estimate camera pose at the operation 406 by performing Equation (1) shown below for lane markers within the pre-determined distance of the location of the pixel locations:

$$\underset{\xi_{cor}}{\mathrm{argmin}}\ E_{cost} + E_{con} \qquad \text{Equation (1)}$$

where $E_{cost}$ is cost term for misalignment, and where $E_{con}$ is cost term for constraint. The cost term for misalignment $E_{cost}$ is described in Equations (2) to (4) below and the cost term for constraint in $E_{con}$ described in Equation (5) below;

$$E_{cost} = \sum_i \sum_j \|e_{i,j}\|_2^2 \qquad \text{Equation (2)}$$

$$e_{i,j} = \rho(DT(x_{i,j})) \qquad \text{Equation (3)}$$

$$x_{i,j} = \pi(K[I_{3\times 3}\ |\ 0]G(\xi_{cor})T_{imu}^{cam}T_{enu}^{imu}X_{i,j}) \qquad \text{Equation (4)}$$

where the e(i, j) represents the misalignment error of the j-th corner point from i-th lane marker that fetched from the map, the function $\rho(DT(x_{i,j}))$ indicates a robust loss function, and DT stands for the distance-transformation function. The X(i, j) is a vector representing one point in homogeneous coordinate system. K represents a 3×3 camera intrinsic matrix and I_(3×3) represents a 3×3 identical matrix. The function \pi is used to normalize the homogeneous coordinate.

In some embodiments, the computer can determine the 6 DoF variables that describe a pose of the camera by minimizing a distance from the 3D world coordinates of one or more corners of a lane marker obtained from the HD map within a pre-determined distance of the location of the autonomous vehicle and the pixel locations of a corresponding lane marker (e.g., a corner of the lane marker) from the obtained image.

In some embodiments, the computer can estimate camera pose (e.g., at the operation 406) by adding a regularization term to enable smoothness using Equations (5) to (10) as shown below:

$$E_{con} = \|\theta(\xi_{cor})\|\Omega_1^2 + \|\phi(\xi_{cor})\|\Omega_2^2 + \|\theta(\xi_{cor}) - \theta(\xi_{prev})\| \\ \|\Omega_3^2 + \|\phi(\xi_{cor}) - \phi(\xi_{prev})\|\Omega_4^2 + \eta(\xi_{cor}, \xi_{prev}) \qquad \text{Equation (5)}$$

where $\theta(\ )$ in Equation (5) is the function to obtain roll, pitch and yaw from se(3) as further described in Equations (7) to (10). SE(3) is Special Euclidean Transformation, which represents a Rigid transformations in 3D space and it is a 4×4 matrix. The Lie algebra of SE(3) is se(3), which has an exponential map to SE(3), and it is a 1×6 vector. The function $\phi(\ )$ is designed to get translation vector from se(3). The function ((cor) is the se(3) representation of the corrected camera pose while the ξ(prev) is the se(3) representation of the camera pose of previous frame. The $\Omega_1$ to $\Omega_4$ terms are diagonal matrixes, where omega represents a weight of that term. We also set boundaries for each of the degree of freedom and the function η((cor), ξ(prev)) is defined as $$\eta(\xi_{cor}, \xi_{prev}) = \begin{cases} 0 & \text{else} \\ 10^7 & |r_x| > \gamma_1 \text{ or } \ldots \text{ or } |\Delta t_x| > \gamma_{12} \end{cases} \quad \text{Equation (6)}$$

The regularization term of Equation (6) can be viewed as a type of constraint that bound the space of parameter searching space. Adding a regularization term is a technically beneficial features at least because doing so can minimize the change in all 6 DoF parameters for a single time estimation. As shown in Equation (5), the pose of the camera can be based on a function that adds a constraint to limit parameter search space. The cost of constraint term shown in Equation (5) is determined by minimizing a difference between the estimated (corrected) camera pose at the current time frame and the pose that estimated from the previous time frame.

$$\theta(\xi_{cor}) = (r_x, r_y, r_z) \quad \text{Equation (7)}$$

where $\theta(\xi_{cor})$ is the function to obtain rotation from the se(3) in lie algebra, and $r_x$, $r_y$, and $r_z$ are the rotation values with respect to the camera coordinate along the x, y, and z axis, respectively, on the image plane where the camera image is obtained.

$$\phi(\xi_{cor}) = (t_x, t_y, t_z)^T \quad \text{Equation (8)}$$

where $\phi(\xi_{cor})$ is the function to obtain the translation, and $t_x$, $t_y$, and $t_z$ are the translation values with respect to the camera coordinate of the x, y, and z axis, respectively, on the image plane.

$$\theta(\xi_{cor}) - \theta(\xi_{prev}) = (\Delta r_x, \Delta r_y, \Delta r_z) \quad \text{Equation (9)}$$

where $\theta(\xi_{cor}) - \theta(\xi_{prev})$ is the difference between the current value for the rotation and the previous rotation calculated from the previous image frame.

$$\phi(\xi_{cor}) - \phi(\xi_{prev}) = (\Delta t_x, \Delta t_y, \Delta t_z)^T \quad \text{Equation (10)}$$

where $\phi(\xi_{cor}) - \phi(\xi_{prev})$ is the difference between the current value for the translation and the previous translation from the previous image frame.

Figure 5:
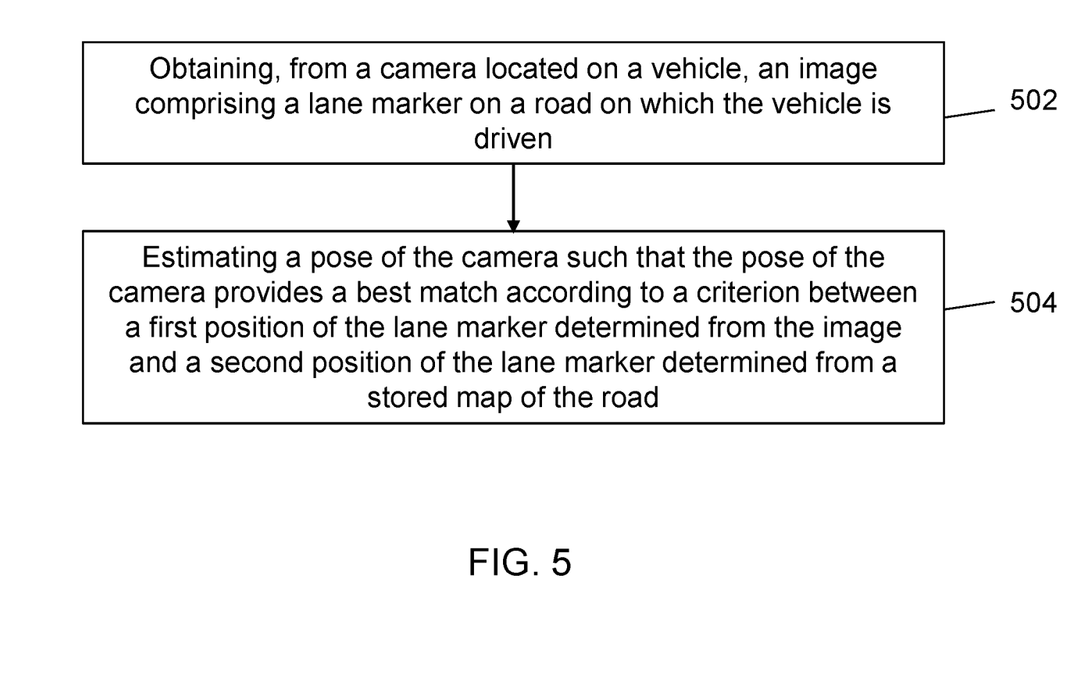
FIG. 5 shows an exemplary flow diagram of operations to estimate camera pose.

FIG. 5 shows an exemplary flow diagram of operations performed to estimate camera pose. At the obtaining operation 502, an observed lane marker module (shown as the observed lane marker module 625 in FIG. 6) can obtain an image from a camera located on a vehicle, where an image including a lane marker on a road on which the vehicle is driven. At the estimating operation 504, a camera pose module (shown as the camera pose module 630 in FIG. 6) can estimate a pose of the camera such that the pose of the camera provides a best match according to a criterion between a first position of the lane marker determined from the image and a second position of the lane marker determined from a stored map of the road.

In some embodiments, first position corresponds to pixel locations associated with a corner of the lane marker, and the second position corresponds to a three-dimensional (3D) world coordinates of the corner of the lane marker. In some embodiments, the best match according to the criterion is determined by minimizing a function of a cost of misalignment term by minimizing a distance from the 3D world coordinates of the corner of the lane marker to the pixel locations associated with the corner of the lane marker. In some embodiments, the distance is minimized by minimizing a sum of squared distance between the pixel locations associated with the corner of the lane marker and the 3D world coordinates of the corner of the lane marker.

In some embodiments, the best match according to the criterion is determined by minimizing the function of a combination of the cost of misalignment term and of a cost of constraint term, where the cost of constraint term represents a constraint to limit parameter search space, and where the cost of constraint term is determined by minimizing a difference between the pixel locations and a third position of the corner of the lane marker from a previous image obtained as the vehicle is driven.

In some embodiments, the method of FIG. 5 further includes generating a binary image from the image obtained from the camera, and generating a gray-scale image from the binary image, where the gray-scale image includes pixels with corresponding values, a value of each pixel is a function of a distance between a pixel location in the gray-scale image and the first position of the corner of lane marker in the gray-scale image. In some embodiments, the method of FIG. 5 further includes generating a gray-scale image from the image, wherein the gray-scale image includes pixels with corresponding values, wherein a value of each pixel is a function of a distance between a pixel location in the gray-scale image and the first position of the corner of lane marker in the gray-scale image.

In some embodiments, the second position of the lane marker is determined by the static lane marker module (shown as the static lane marker module 620 in FIG. 6) based on the location of the vehicle, a direction in which the vehicle is driven, and a pre-determined field of view (FOV) of the camera. In some embodiments, the second position of the lane marker is determined by the static lane marker module by obtaining, from the stored map and based on the location of the vehicle, a first set of one or more lane markers that are located within a pre-determined distance from the vehicle, obtaining a second set of one or more lane markers from the first set of one or more lane markers based on the direction in which the vehicle is driven, obtaining a third set of one or more lane markers from the second set of one or more lane markers based on a pre-determined FOV of the camera, and obtaining the second position of the lane marker from the third set of one or more lane markers. In some embodiments, the third set of one or more lane markers excludes one or more lane markers determined to be obstructed by one or more objects.

In some embodiments, the first position corresponds to at least one location associated with the lane marker, and wherein the second position corresponds to a three-dimensional (3D) world coordinates of the at least one location of the lane marker. In some embodiments, the best match according to the criterion is determined by minimizing a function of a cost of misalignment term by minimizing a distance from the 3D world coordinates of the at least one location of the lane marker to the at least one location of the lane marker. In some embodiments, the best match according to the criterion is determined by minimizing the function of the cost of misalignment term and of a cost of constraint term. In some embodiments, the cost of constraint term represents a constraint that limits a search space. In some embodiments, the cost of constraint term is determined by minimizing a difference between the at least one location and a third position of the corner of the lane marker from a previous image obtained as the vehicle is driven.

In some embodiments, the second position of the lane marker is determined based on at least the location of the vehicle. In some embodiments, the second position of the lane marker is determined by obtaining, from the stored map and based on the location of the vehicle, a first set of lane markers that are located within a pre-determined distance from the vehicle; obtaining a second set of lane markers from the first set of lane markers based on a direction in which the vehicle is driven; obtaining a third set of lane markers from the second set of lane markers based on a pre-determined FOV of the camera; and obtaining the second position of the lane marker from the third set of lane markers.

In some implementations, methods described in the various embodiments in this patent document are embodied in a computer readable program stored on a non-transitory computer readable media. The computer readable program includes code that when executed by a processor, causes the processor to perform the methods described in this patent document, including the method described in FIG. 5.

In some embodiments, a system includes a processor and a memory. The memory storing instructions associated with a static lane marker module, an observed lane marker module, and/or a camera pose estimating module is executable by the processor to perform an operation to estimate camera pose. The system may, for example, include an apparatus, such as a computer, wherein the apparatus includes the above-mentioned memory and the above-mentioned processor.

Figure 6:
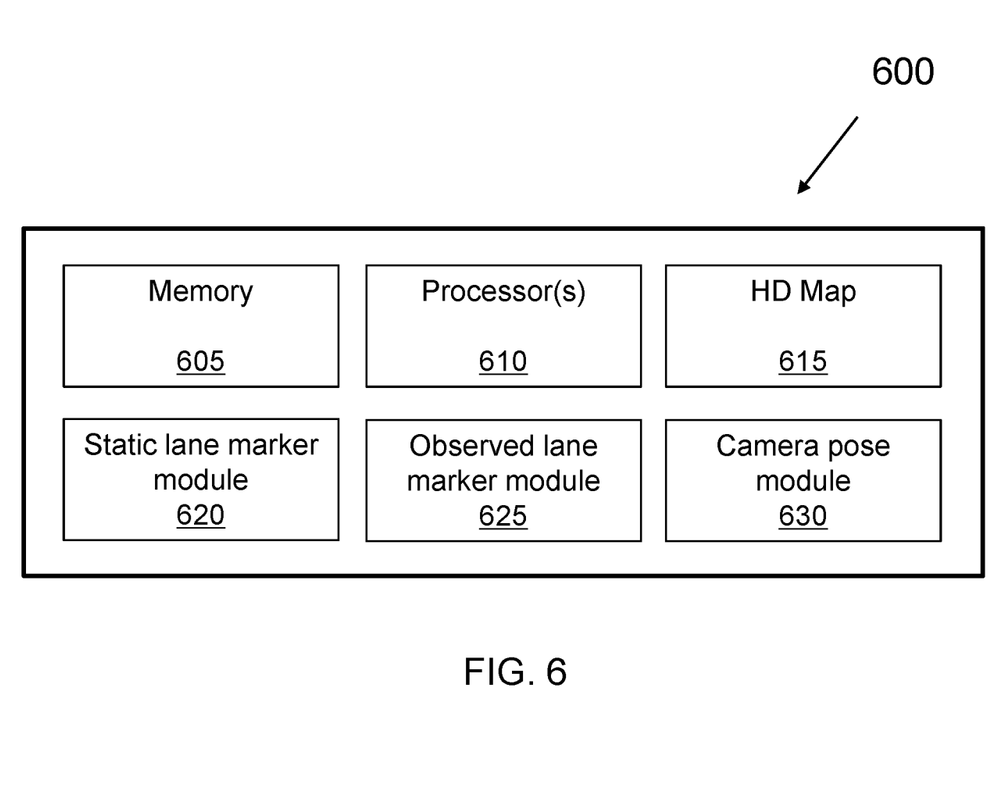
FIG. 6 shows an exemplary block diagram of a computer located in a vehicle to estimate camera pose.

FIG. 6 shows an exemplary block diagram of a computer located in an autonomous vehicle to estimate camera pose as described in this patent document. The computer 600 includes at least one processor 610 and a memory 605 having instructions stored thereupon. The instructions upon execution by the processor 610 configure the computer 600 to perform the operations described in FIG. 1 to 5, and/or the operations described in the various embodiments in this patent document. The static lane marker module 620 can perform the operations to obtain static lane markers related information described in FIGS. 1 and 3 and in the various embodiments in this patent document. The observed lane marker module 625 can perform operations to obtain observed lane markers related information described in FIGS. 1, 4, and 5 and in the various embodiments in this patent document. The camera pose module 630 can perform operations to estimate camera pose as described in FIGS. 1, 4, and 5 and in the various embodiments in this patent document.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of estimating camera pose, comprising:
   obtaining, from a camera located on a vehicle, an image comprising a lane marker on a road on which the vehicle is driven; and
   estimating a pose of the camera such that the pose of the camera provides a best match according to a criterion between a first position of the lane marker determined from the image and a second position of the lane marker determined from a stored map of the road,
      wherein the first position corresponds to pixel locations associated with a corner of the lane marker,
      wherein the second position corresponds to a three-dimensional (3D) world coordinates of the corner of the lane marker,
   wherein the second position of the lane marker is determined by:

obtaining, from the stored map and based on a location of the vehicle, a first set of one or more lane markers that are located within a pre-determined distance from the vehicle;

obtaining a second set of one or more lane markers from the first set of one or more lane markers based on a direction in which the vehicle is driven;

obtaining a third set of one or more lane markers from the second set of one or more lane markers based on a pre-determined field of view (FOV) of the camera; and obtaining the second position of the lane marker from the third set of one or more lane markers;

wherein the best match according to the criterion is determined by minimizing a function of a combination of a cost of misalignment term and of a cost of constraint term, wherein the cost of misalignment term is determined by minimizing a distance from the 3D world coordinates of the corner of the lane marker to the pixel locations associated with the corner of the lane marker, and wherein the cost of constraint term is determined by minimizing a difference between a first estimated camera pose at a first time when the image is obtained and a second estimated camera pose from a second time, wherein the second time precedes in time the first time.

2. The method of claim 1, wherein the distance is minimized by minimizing a sum of squared distance between the pixel locations associated with the corner of the lane marker and the 3D world coordinates of the corner of the lane marker.

3. The method of claim 1, further comprising:
generating a binary image from the image obtained from the camera; and
generating a gray-scale image from the binary image, wherein the gray-scale image comprises pixels with corresponding values, wherein a value of each pixel is a second function of a second distance between a pixel location in the gray-scale image and the first position of the corner of lane marker in the gray-scale image.

4. The method of claim 1, wherein the third set of one or more lane markers excludes one or more lane markers determined to be obstructed by one or more objects.

5. The method of claim 1, wherein the cost of constraint term is another function of a first set of rotation values of the camera associated with the first time, a second set of translation values of the camera associated with the first time, a second difference between the first set of rotation values and a third set of rotation values of the camera associated with the second time, and a third difference between the second set of translation values and a fourth set of translation values of the camera associated with the second time.

6. A system comprising:
a processor; and
a memory that stores instructions executable by the processor to:
obtain, from a camera located on a vehicle, an image comprising a lane marker on a road on which the vehicle is driven; and
estimate a pose of the camera such that the pose of the camera provides a best match according to a criterion between a first position of the lane marker determined from the image and a second position of the lane marker determined from a stored map of the road,
wherein the first position corresponds to pixel locations associated with a corner of the lane marker,
wherein the second position corresponds to a three-dimensional (3D) world coordinates of the corner of the lane marker,
wherein the second position of the lane marker is determined by the processor configured to:
obtain, from the stored map and based on a location of the vehicle, a first set of one or more lane markers that are located within a pre-determined distance from the vehicle;
obtain a second set of one or more lane markers from the first set of one or more lane markers based on a direction in which the vehicle is driven;
obtain a third set of one or more lane markers from the second set of one or more lane markers based on a pre-determined field of view (FOV) of the camera; and
obtain the second position of the lane marker from the third set of one or more lane markers;
wherein the best match according to the criterion is determined by minimizing a function of a combination of a cost of misalignment term and of a cost of constraint term,
wherein the cost of misalignment term is determined by minimizing a distance from the 3D world coordinates of the corner of the lane marker to the pixel locations associated with the corner of the lane marker, and
wherein the cost of constraint term is determined by minimizing a difference between a first estimated camera pose at a first time when the image is obtained and a second estimated camera pose from a second time, wherein the second time precedes in time the first time.

7. The system of claim 6, wherein the cost of constraint term represents a constraint that limits a search space.

8. The system of claim 6, wherein the cost of constraint term is another function of a first set of rotation values of the camera associated with the first time, a second set of translation values of the camera associated with the first time, a second difference between the first set of rotation values and a third set of rotation values of the camera associated with the second time, and a third difference between the second set of translation values and a fourth set of translation values of the camera associated with the second time.

9. A non-transitory computer readable storage medium having code stored thereon, the code, when executed by a processor, causing the processor to implement a method, comprising:
obtaining, from a camera located on a vehicle, an image comprising a lane marker on a road on which the vehicle is driven; and
estimating a pose of the camera such that the pose of the camera provides a best match according to a criterion between a first position of the lane marker determined from the image and a second position of the lane marker determined from a stored map of the road,
wherein the first position corresponds to pixel locations associated with a corner of the lane marker,
wherein the second position corresponds to a three-dimensional (3D) world coordinates of the corner of the lane marker,
wherein the second position of the lane marker is determined by:

obtaining, from the stored map and based on a location of the vehicle, a first set of lane markers that are located within a pre-determined distance from the vehicle;

obtaining a second set of lane markers from the first set of lane markers based on a direction in which the vehicle is driven;

obtaining a third set of lane markers from the second set of lane markers based on a pre-determined field of view (FOV) of the camera; and obtaining the second position of the lane marker from the third set of lane markers;

wherein the best match according to the criterion is determined by minimizing a function of a combination of a cost of misalignment term and of a cost of constraint term, wherein the cost of misalignment term is determined by minimizing a distance from the 3D world coordinates of the corner of the lane marker to the pixel locations associated with the corner of the lane marker, and wherein the cost of constraint term is determined by minimizing a difference between a first estimated camera pose at a first time when the image is obtained and a second estimated camera pose from a second time, wherein the second time precedes in time the first time.

10. The non-transitory computer readable storage medium of claim 9, wherein the method further comprises:

generating a gray-scale image from the image, wherein the gray-scale image comprises pixels with corresponding values, wherein a value of each pixel is a second function of a second distance between a pixel location in the gray-scale image and the first position of lane marker in the gray-scale image.

11. The non-transitory computer readable storage medium of claim 9, wherein the distance is minimized by minimizing a sum of squared distance between the pixel locations associated with the corner of the lane marker and the 3D world coordinates of the corner of the lane marker.

12. The non-transitory computer readable storage medium of claim 9, wherein the third set of lane markers excludes one or more lane markers determined to be obstructed by one or more objects.

13. The non-transitory computer readable storage medium of claim 9, wherein the cost of constraint term is another function of a first set of rotation values of the camera associated with the first time, a second set of translation values of the camera associated with the first time, a second difference between the first set of rotation values and a third set of rotation values of the camera associated with the second time, and a third difference between the second set of translation values and a fourth set of translation values of the camera associated with the second time.

* * * * *